United States Patent
Vissers (10) Patent No.: US 10,888,802 B2
(45) Date of Patent: Jan. 12, 2021

(54) FLUID TREATMENT SYSTEM

(71) Applicant: Arnoldus Johannes Wilhelmus Henricus Vissers, Houston, TX (US)

(72) Inventor: Arnoldus Johannes Wilhelmus Henricus Vissers, Houston, TX (US)

(73) Assignee: NOV Process and Flow Technologies US, Inc.

( * ) Notice: Subject to any disclaimer, the term of this patent is extended or adjusted under 35 U.S.C. 154(b) by 0 days.

(21) Appl. No.: 16/293,263

(22) Filed: Mar. 5, 2019

(65) Prior Publication Data

US 2020/0282334 A1    Sep. 10, 2020

(51) Int. Cl.

| B01D 17/02 | (2006.01) |
|---|---|
| B01D 21/26 | (2006.01) |
| B01D 21/34 | (2006.01) |
| B01D 19/00 | (2006.01) |
| B01D 45/12 | (2006.01) |
| B01D 45/02 | (2006.01) |
| B01D 21/30 | (2006.01) |
| B01D 21/24 | (2006.01) |
| B01D 21/00 | (2006.01) |
| B04C 5/26 | (2006.01) |
| B04C 5/13 | (2006.01) |
| B04C 9/00 | (2006.01) |

(52) U.S. Cl.
CPC ........ B01D 17/0217 (2013.01); B01D 21/267 (2013.01); B01D 21/34 (2013.01); B04C 5/26 (2013.01); *B01D 2221/04* (2013.01)

(58) Field of Classification Search
CPC ............ B01D 17/0208; B01D 21/0012; B01D 21/2444; B01D 21/0003; B01D 2221/12; B01D 17/0217; B01D 21/267; B01D 21/34; B01D 2221/04; B01D 19/0057; B01D 45/12; B01D 45/02; B01D 21/30; B01D 21/2427; B01D 21/0024; E03F 5/16; B04C 5/26; B04C 5/13; B04C 9/00
USPC ....................................... 210/747.2
See application file for complete search history.

(56) References Cited

U.S. PATENT DOCUMENTS

| 2,698,672 A * | 1/1955 | Burnside ................. B04C 5/13 |
| | | 55/410 |
| 3,200,568 A * | 8/1965 | McNeil ..................... B07B 7/08 |
| | | 96/195 |
| 3,568,835 A * | 3/1971 | Hansen ............. B01D 21/0012 |
| | | 210/86 |
| 4,426,293 A * | 1/1984 | Mason ............... B01D 17/0217 |
| | | 210/636 |
| 5,129,931 A | 7/1992 | Oranje |
| 9,827,510 B2 * | 11/2017 | Garbon ................. B01D 21/02 |

(Continued)

FOREIGN PATENT DOCUMENTS

GB    2332632 A *   6/1999   ............... B04C 9/00

*Primary Examiner* — Nam X Nguyen
*Assistant Examiner* — Ekandra S. Miller-Cruz
(74) *Attorney, Agent, or Firm* — Jonathan Pierce; Pierre Campanac; Porter Hedges LLP (57) ABSTRACT

A fluid treatment system combines cyclonic separators and gravitational separators for use in onshore and offshore oil and gas operations and elsewhere. The characteristics of apertures that interface between a gravitational separation chamber and a cyclonic separator are configurable in accordance with operational requirements. By selecting aperture characteristics, improved control and separation efficiencies can be achieved.

19 Claims, 5 Drawing Sheets

(56) References Cited

U.S. PATENT DOCUMENTS

2009/0020467 A1* 1/2009 Parkinson .......... B01D 17/0217
   210/188
2011/0036239 A1* 2/2011 Sarshar ............. B01D 19/0057
   95/259

* cited by examiner

FLUID TREATMENT SYSTEM

BACKGROUND

The present disclosure relates to a fluid treatment system for improving the separation of a mixture of at least two portions.

In oil and gas production processes, production fluids recovered from a reservoir often contain a mixture of fluids, such as oil, gas and water, as well as particulate solids, such as sand, reservoir rock grains and plug drill out particles. Water and solids are typically unwanted components, or waste products, in a production fluid mixture and are disposed of; transporting water through a production system can reduce the overall efficiency of a production system, and the flow of solids through a system can cause erosion of pipeline components or instrumentation. Therefore there is a need to effectively separate the water and/or solids from the oil and gas.

Solids filtration techniques such as sand control screens have been used in wellbores as a physical barrier to block solid particles from entering a production flow whilst allowing the flow of gas, oil and water through the screen. In such techniques the screens have a physical limit to the particle size that can be filtered which can degrade over time due to corrosion or erosion of the screens. In practice additional separation equipment is provided further downstream in a system to separate produced water and solids.

Large separator tanks, such as skim tanks or spherical desanders, have been used to remove oil from water in which oil is skimmed off the top of a mixture of oil and water as the water and any solids present sink toward the bottom of the tank. Outlets are provided to remove the water and settled solids beneath. However, separator tanks and non-pressurized separation equipment are sometimes difficult to implement into a system due to their large area footprint. For example, the constraints of offshore oil production, such as the size of the offshore platform, require that the separation apparatus is both effective and compact.

Cyclone separators have been developed to meet these requirements. In particular, hydrocyclones have become popular in the oil and gas industry for the rapid removal of oil from water, which operate by creating a centrifugal force as a fluid mixture of water and oil enters the hydrocyclone through a tangential inlet. The centrifugal force directs the heavier water phase toward the edges of the hydrocyclone, while the lighter oil phase is retained at the centre of the hydrocyclone. The two phases of oil and water can then be extracted from the hydrocyclone separately; the water is extracted via a clean water outlet while the oil is extracted via an oil production line. However, despite its advantages, cyclone separator systems often do not separate fluid mixtures as effectively as skim tanks which lead to solids and/or water being drawn up an oil production line.

Cyclone separators have been combined with gravitational separators in the past in an attempt to enhance separation efficiencies within multiphase flows. However it has been difficult to control the performance of combined separation systems in a synergistic way that optimises and allows improved control of the separation efficiency of each separator apparatus in the system. For example, the separation time of smaller sized solids from a multiphase mixture in a combined separation system may be governed by a fixed settling time or flow characteristics in the gravitational separator in the system, which means that the inclusion of a cyclone separator in a gravitational separator may have little effect on the overall operational efficiency of the system.

An object of the present disclosure is to improve fluid separation and operational efficiencies of separation systems for use in onshore and offshore oil and gas operations and elsewhere.

SUMMARY

According to an aspect of the disclosure there is provided a fluid treatment system for separating a mixture, comprising: a housing and a cyclonic separator positioned within the housing, the cyclonic separator configured to receive the mixture, discharge a first portion of the mixture from the housing through a first outlet and discharge a remaining portion of the mixture into the housing, the housing defining a gravitational separating chamber and comprising a second outlet for discharging a second portion of the mixture from the housing, the system further comprising at least one aperture arranged between the housing and the cyclonic separator, such that, in use, at least a component of the remaining portion re-enters the cyclonic separator through the at least one aperture so as to optimise the separation of the mixture between the first portion and the second portion.

In this way it is possible to improve the control and effectiveness in separating mixtures having at least two fluid portions. A first stage of separation occurs in the cyclonic separator based on the flow rate of the mixture from the inlet and the resulting centrifugal forces on the mixture within the cyclonic separator. In the cyclonic separator the lighter phases of the mixture (e.g. water, oil and/or gas as compared to solids) remain towards the centre, or core, of the vortex generated within the cyclonic separator, due to a reduced mass inertia effect of these lighter phases, such that the first portion is discharged through the first outlet as mixture enters the cyclonic separator. The remaining portion, i.e. the heavier phases of liquid and/or solids, are pushed outwardly by the centrifugal forces to the edges of the cyclonic separator and discharged into the surrounding gravitational separating chamber. The cyclonic separator can be configured such that the first stage of separation optimally controls the composition of the first portion to be discharged and allow the remaining portion (which may be less efficiently separated) to be discharged into the housing, where further gravitational separation takes place.

A second stage of separation occurs in the housing, in which gravitational forces act on the discharged remaining portion such that a fluid separation takes place. This separation is a result of heavier fluids and/or solid particles sinking toward the bottom of the housing and lighter fluids rising toward the top of the housing. The heavier fluids and/or solids that descend to the lower part of the housing allow the second portion of the mixture to be discharged through the second outlet.

The fluid treatment system comprises at least one aperture arranged between the housing and the cyclonic separator to allow the separated lighter fluids in the remaining portion (which have risen toward the top of the housing) to recombine with the first portion as it is discharged from the first outlet. This is due to the differential pressure between the two flow paths being discharged from the first outlet (the first flow path being discharged directly out of the cyclonic separator from the inlet (without passing through the housing), and the second flow path being discharged through the first outlet via the housing and the at least one aperture.

The split of these two flow paths, which are both discharged via the first outlet, is influenced by the composition and flow conditions of the mixture, the geometry of the cyclone separator and its position within the housing, the geometry of the housing itself, and the geometry and number of apertures between the cyclonic separator and the housing. These properties define the hydrostatic balance of the system and thereby determine the split of the two flow paths being discharged through the first outlet and the separation performance within the cyclone separator and the gravitational separation in the housing.

The overall separation performance can therefore be influenced by changing at least one of the control parameters, aperture, flow conditions, cyclone geometry/location and/or housing. Therefore the fluid treatment system allows efficient and rapid separation of a mixture as well as improved control of the compositions of the first and second component of the mixture.

Preferably the at least one aperture controls a flow rate between the gravitational separating chamber and a fluid re-entry zone in the cyclonic separator. In this way it is possible to determine the flow rate across the aperture such that the hydrostatic balance of the fluid treatment system (of both the cyclonic separator and the gravitational separating chamber) can be better controlled. Typically, the flow conditions, the geometry and location of a cyclonic separator and a housing/gravitational separating chamber are fixed. It has been advantageously found that the number of apertures, the configuration of apertures and/or the geometry of the aperture(s) may define the flow split between the two flow paths being discharged from the first outlet and thereby control the separation performance of the heaviest fluid/solids. With the ability to adjust the aperture(s), the functionality is established to influence the flow split and thereby the separation performance.

Preferably the component of the remaining portion which re-enters the cyclonic separator combines with the first portion. In this way it is possible to control the volume flow rates (and thereby the fluid velocities) between both flow paths, which are established by the hydrostatic balance of the fluid treatment system and thereby regulate the separation of the inlet mixture split between the two flow paths and outlets (the light fluid outlet and the heavy fluid/solids outlet) in a self-controlled manner. This on its turn enables a self-regulating system, with regards to the flow split and separation performance of the system. The number of apertures, the configuration of apertures and/or the geometry of the aperture(s), create a functionality that can influence the flow split and separation performance, within the self-regulating system.

The at least one aperture may be configured to influence a drag force acting on the mixture within the gravitational separating chamber. In this way it is possible to allow regulation of the aperture size or geometry such that smaller particle sizes, or less heavy fluid droplets, can be effectively separated from a mixture in the gravitational separating chamber. When the remaining portion is discharged from the cyclonic chamber into the housing, the remaining portion separates such that heavier fluids and/or solid particles sink and lighter fluids rise, due to gravity. As the heavier fluids/solids sink toward the bottom of the housing (and toward the second outlet), due to the gravitational force acting upon them, they experience a drag force that counters the gravitational force, which is caused by a pressure differential around a descending solid particle or heavy fluid droplet as the lighter fluids in the mixture flow upwards against it toward the top of the housing, (also known as Stoke's Law). The greater the velocity of the rising fluids (i.e. a higher flow rate) against a descending particle (heavier fluid droplet/solid), the greater the drag force that acts on the particle. This means that solids of a smaller particle size, or less heavy fluids, are retarded by the drag force and would take longer to separate to the bottom of the housing, or not be separated at all.

The at least one aperture arranged between the housing and the cyclonic chamber controls the flow split based on the hydrostatic balanced system within the fluid treatment system by controlling the flow rate of the component of the remaining portion in the housing which passes through the aperture from the housing into the cyclonic separator toward the first outlet. Flow rate is a function of pressure differential and the geometry of an opening/channel of the aperture, as will be understood in Bernoulli's Law. Therefore, by adjusting an aperture's geometry (open area), the flow rate can be adjusted through the at least one aperture, which enables control of the drag force experienced by the remaining portion in the housing, when considering the pressure drop over the at least one aperture is fixed by the hydrostatic balance in the system (that is based upon the fluid properties and flow conditions coming in). This in turn would allow a particle of a smaller size to be separated more easily, by reducing the apertures (open area), since the drag force acting on it would be lower (assuming a constant gravitational force). Similarly the amount of lighter fluids in the remaining portion that combines with the first portion to be discharged via the first outlet would also be controlled by the at least one aperture.

Preferably the drag force determines a degree of solids separation from the mixture. In this way it is possible for a predetermined size of solid particles, such as sand, to be separated from the mixture by controlling the drag force experienced by the remaining portion within the housing. A greater drag force would result in a lesser degree of solids separation, and vice versa.

The cyclonic separator may comprise a nozzle configured to discharge the remaining portion into the housing. In this way it is possible to control the direction or the flow characteristics as the remaining portion is discharged from the cyclonic chamber into the housing. The nozzle may be shaped or configured to control the discharge flow rate which in turn may influence the pressure and/or forces (including centrifugal forces) within the cyclonic chamber, thereby affecting the composition of the outlet fluids. The shape of the nozzle may also affect a degree of turbulence of the discharged remaining portion in the housing, which in turn may influence separation times in the gravitational separating chamber.

The size of the at least one aperture may be configured to be variable. In this way it is possible to control the flow rate through the aperture (and the drag force experienced by the remaining portion in the housing) by changing the size, or diameter, of the aperture. Therefore an aperture with a controllable size provides the fluid treatment system with an additional control variable to optimise the flow rate and drag force of the remaining portion. A smaller aperture would result in a lower flow rate (and drag force) in the second flow path through the housing, where the gravitational separation takes place, but at the same time a smaller aperture would result in a smaller portion to be split within the cyclonic separator, influencing the separation performance within the cyclonic separator stage. Therefore, a variable size of the at least one aperture, enables a flexibility towards optimizing overall separation performance of the heavier fluids/solids from the lighter fluids for changing or different compositions of the mixture that enters the system.

The fluid treatment system may further comprise at least one additional aperture arranged between the cyclonic separator and the first outlet, such that, in use, the at least one aperture and the at least one additional aperture provide a multi-stage flow restriction between the housing and the first outlet. In this way, at least two apertures (one aperture arranged between the housing and the cyclonic separator and the other arranged between the cyclonic separator and the first outlet) can be placed in series (i.e. in a sequential manner) to provide a dual/multi stage flow restriction.

Preferably each size of the at least one aperture or the at least one additional aperture is configured to be individually variable. In this way it is possible to have multiple channels of flow between the housing and the cyclonic chamber, where each aperture can be independently controlled such that separation can be optimised. The multiple apertures can be evenly distributed around a circumference of the cyclonic chamber such that the controlled flow rate can also be better distributed across the remaining portion within the gravitational separating chamber.

The fluid treatment system may further comprise a regulator valve, wherein the regulator valve is configured to control the aperture size between a fully-open position and a fully-closed position. In this way it is possible to control the aperture size(s) in accordance with or in response to the composition, amount of solids, and/or fluid characteristics, such as flow rate, of the mixture received from the inlet of the fluid treatment system, thereby providing controllability of the flow rate of the remaining portion in the housing and through the aperture(s).

The regulator valve may be arranged toward the first outlet and enable a first flow directly from the cyclonic separator and a second flow from the fluid re-entry zone to combine into one outgoing flow of the first portion. In this way the regulator valve, or an integrated control valve, combines the both flow splits (from the main body of the cyclonic separator and from the fluid re-entry zone) into one outlet flow (through the first outlet). The integrated control valve may be part of an outlet nozzle between the cyclonic separator and the first outlet. The valve may be a fully-integrated module, which can be integrated (i.e. an add-on feature) into the system to further enable flow controllability. Without the specially-designed control valve, the further controllability is not present, and the system follows the self-regulating mechanism as described above. An integrated module which can be separately added on to the system provides the ability to service/refurbish the controllability of the flow split control valve (e.g. interventions) as well as allow this add-on feature as an optional extra to the fluid treatment system.

The body of the cyclonic separator may be substantially cylindrical. In this way it is possible to better control the centrifugal force acting on the mixture in the cyclonic separator based on the aperture size, fluid properties and flow rates present. The body of the cyclonic separator may also be conically shaped, such that the geometry of the cyclonic design provides specifically designed or additional centrifugal forces to the mixture, based on physics that relate to the Law of conservation of angular momentum. The fixed geometry of the cyclonic separator may be a control variable of the fluid treatment system to optimise the separation performance of the system.

The cyclonic separator may further comprise a cone-shaped section oppositely positioned to the first outlet in the cyclonic separator such that the apex of the cone-shaped section is arranged to point toward the first outlet. In this way it is possible to prevent or limit solid particles that may be present toward the core of the vortex from being discharged through the first outlet. The cone-shaped section provides a local gravity-based separator in the form of a sloped side of the cone which allows solid particles, such as sand, to slide down the cone and be discharged into the gravitational separating chamber. The apex of cone-shaped section prevents any solids or heavier fluids from settling within the central region of the vortex, thus facilitating the discharge of lighter fluids through the first outlet.

Preferably the cyclonic separator is positioned along a central axis of the housing. In this way more favourable flow split and optimized gravitational separation within the fluid treatment system can be achieved and more easily controlled. Positioning the cyclonic separator along the centre of the housing allows the discharge of remaining portion from the cyclonic separator into the housing and the flow characteristics of the remaining portion from the housing back into the cyclonic separator (for discharge through the first outlet) to be more uniform.

Preferably the housing is a spherical separator and the length of the cyclonic separator is a component in defining the separation performance of the fluids characteristics entering the system. The cyclonic separator is adequately designed in terms of length and diameter, to optimize the trade-off between the separation within the cyclone separator (based on centrifugal forces) and available gravitational housing volume. A longer cyclonic separator provides a greater length for centrifugal forces to act on the mixture in the cyclonic separator thus allowing greater cyclonic separation before discharge through the first outlet or into the housing. A shorter length of the cyclonic separator enables a larger volume within the housing for gravitational separation. The length of the cyclone separator is a control variable of the fluid treatment system, configured to optimise the separation performance of the system. It may be either larger or shorter then the internal radius of the housing, depending on the fluid characteristics being experienced within the system. Furthermore, a shorter cyclonic separator, may allow for a larger portion of the housing where gravitational separation can take place and accommodate larger volumes of heavier fluids/solids to be stored, in case of batch mode operation of the second outlet.

According to another aspect of the disclosure there is provided a method of separating a mixture in a fluid treatment system, comprising: receiving the mixture into a cyclonic separator positioned within a housing from an inlet of the fluid treatment system; discharging a first portion of the mixture from the housing through a first outlet and discharging a remaining portion of the mixture into the housing, the housing defining a gravitational separating chamber and comprising a second outlet; separating the remaining portion in the housing and discharging a second portion of the mixture from the housing; and returning at least a component of the remaining portion into the cyclonic separator through at least one aperture arranged between the housing and the cyclonic separator so as to optimise the separation of the mixture between the first portion and the second portion.

BRIEF DESCRIPTION OF THE DRAWINGS

Fluid treatment systems for separating a mixture and methods of separating a mixture in a fluid treatment system are now described, by way of example, with reference to the drawings, in which.

DETAILED DESCRIPTION

Figure 1:
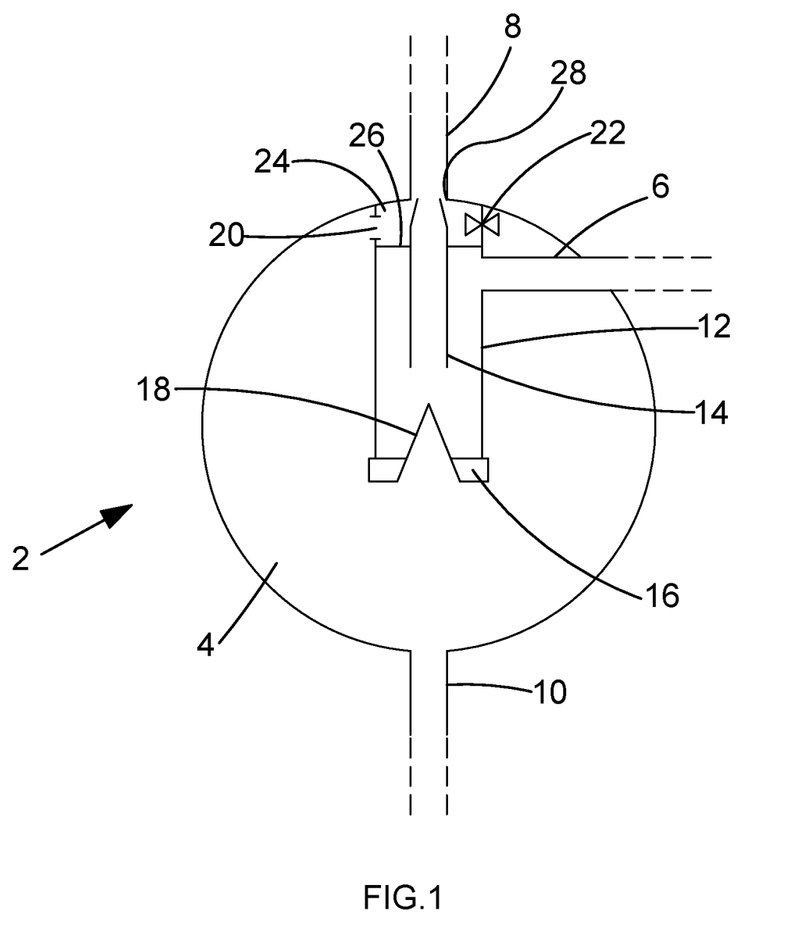
FIG. 1 is a schematic view of a fluid treatment system.

Referring to FIG. 1, a fluid treatment system 2 is shown comprising a spherical gravitational separating chamber 4, an inlet 6, a first outlet 8, a second outlet 10, and a cyclonic separator 12 arranged within the spherical chamber 4. The inlet 6 is designed to deliver multiphase flows of production fluids, such as a mixture of oil, gas, water, salts and sands to the main chamber of the cyclonic separator 12, and the skilled person will appreciate that inlet 6, first outlet 8 and second outlet 10 can be configured to transport various fluids.

The cyclonic separator 12 is positioned vertically along a central axis of the spherical chamber 4 and is designed to receive production fluids from the inlet 6 and separate the lighter phases of the mixture (such as oil and gas) from the heavier phases (such as water and solids) by inducing a vortex within cyclonic separator 12. This is achieved by arranging the inlet 6 tangentially to cyclonic separator 12 such that the direction of mixture flow is caused to rotate as it flows into the cyclonic separator 12, which causes a centrifugal force to be exerted on the mixture. As a result, the heavier, or denser, fluid is forced toward the edge of the cyclonic separator 12 while the lighter fluid moves toward or is retained in the axial centre of cyclonic separator 12. Therefore the received mixture is divided into two portions. Ideally the cyclonic separator 12 can fully separate a mixture such that pure oil/gas is discharged via the first outlet 8 and all other parts (water and solids) are discharged into the spherical chamber 4, as of where water re-enters through the aperture and the solids out through the second outlet 10. However, in practice it is difficult to fully separate fluids in a cyclonic separator and thus there may be a mixture of fluids that are discharged through the first and second outlets.

The lighter fluid toward the centre of the cyclonic separator 12 travels up a channel 14 in the cyclonic separator 12 and is discharged from the spherical chamber 4 via first outlet 8. The remaining heavy fluids are discharged from the cyclonic separator 12 through a nozzle 16 arranged toward the lower end of the cyclonic separator 12 into the spherical gravitational separating chamber 4. The cyclonic separator 12 further comprises a cone section 18, where the apex of the cone section 18 is arranged to point toward the channel 14 such that any stray solids or heavy fluid droplets drawn toward the centre of the cyclonic separator 12 may be directed downward toward the nozzle 16. Furthermore, the cone section 18 establishes a physical constraint of the swirling fluids propagating into the spherical gravitation separating chamber 4 and establish a 180 degree turn of the lighter fluids towards the channel 14, while mitigating the swirling motion of the heavier fluids directed toward the spherical gravitation separating chamber 4 over the nozzle 16.

The remaining fluid that is discharged into the spherical chamber 4 undergoes further separation where gravitational forces act on the fluid so that heavier phases, such as water and solids/sand, settle toward the bottom of the spherical chamber 4 to be discharged via the second outlet 10. The lighter phases of the remaining fluid rise toward the top of the spherical chamber 4 and can flow back into a fluid re-entry zone 24 of the cyclonic separator 12 via an aperture 20 (or valve-controlled opening).

Once the lighter components, or phases, of the remaining fluid re-enter the fluid re-entry zone 24, they can re-combine with the lighter fluid that travels up the channel 14 so that a recombined mixture of the lighter components flows out the system through the first outlet 8. It will be appreciated that the aperture(s) 20 can be configured to control the degree of recombination of the fluid from the spherical chamber 4 and the fluid travelling up the channel 14.

The fluid re-entry zone 24 is arranged toward the top end of the cyclonic separator 12 to provide a geometrically simple and advantageous way for the re-entered fluids to recombine with the cyclonically separated fluids that are to be discharged through the first outlet 8. Aperture 20 can be an open hole or a valve 22 controlled opening. For a valve-controlled opening, a control valve is used to control the size of the opening. It will be appreciated that the size of aperture 20 controls the flow rate between the cyclonic separator 12 and the spherical chamber 4.

An optional barrier plate 26 is provided in the cyclonic separator 12 between the fluid re-entry zone 24 and the main chamber of the cyclonic separator 12 which ensures that the fluid re-entering the cyclonic separator 12 is directed out of the system through first outlet 8 and prevents the fluid from descending into the main chamber of the cyclonic separator 12. However it should be understood that the pressure drop between the two areas (i.e. the fluid re-entry zone 24 and the main chamber of cyclonic separator 12) also prevents the re-entered fluid from descending into the main chamber of cyclonic separator 12.

The interface between the channel 14 and the first outlet 8 may optionally be configured to position a sequential aperture 28 between the fluid re-entry zone 24 and the first outlet 8 in order to provide a multi-stage flow restriction between the spherical chamber 4 and the first outlet 8. Alternatively the first aperture 20 provides the limiting flow restriction and the interface between the channel 14 and first outlet simply allows re-combination to take place.

The fluid treatment system of the present invention can be used to effectively separate various flow mixtures, for example:

Solids separation from a dry gas stream;
Solids separation from a wet gas stream (i.e. gas and condensate);
Solids separation from a multiphase flow comprising gas, oil and water;
Solids separation from a liquid flow (i.e. oil or water or a mixture of oil and water);
Water separation from a multiphase flow (gas and condensation/oil);
Water separation from a single phase flow of oil or gas; or
Oil separation from gas.

It will be understood that the above scenarios are not provided to limit the invention rather to provide exemplary options in how the present invention may be used. The aperture(s) allow recombination of lighter fluids in the first outlet, which enables a self-controlling hydrostatic balanced separation system. Different configurations (e.g. size, number and geometry) of the apertures therefore influence the overall separation performance of the system as well as the individual separation performances of the cyclonic separator and the gravitational separator.

Figure 2A:
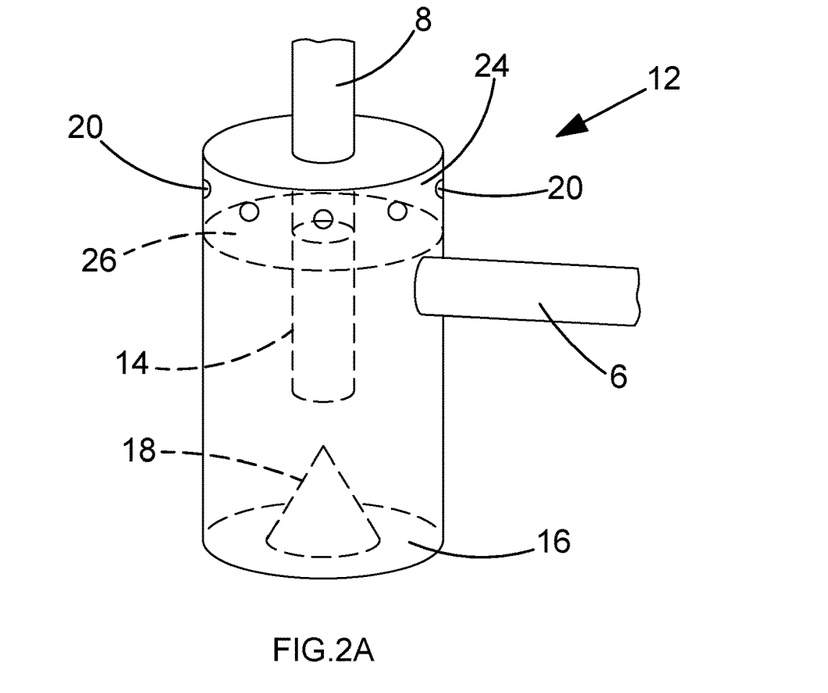
FIG. 2A is a schematic view of a cyclonic separator.
Figure 2B:
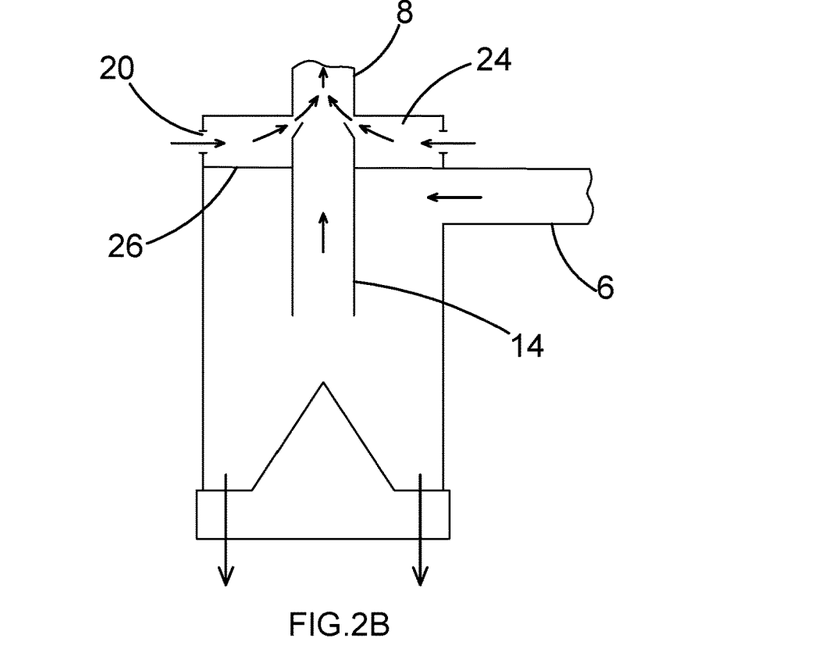
FIG. 2B is a schematic view of a cyclonic separator.

FIGS. 2a and 2b show further schematic views of cyclonic separator 12. Referring to FIG. 2a, the cyclonic separator 12 is shown to have a plurality of apertures 20 arranged toward the upper end of the cyclonic separator 12.

It will be appreciated that each aperture may be equally or differently sized relative to another aperture depending on operational considerations. It will also be appreciated that the apertures may be valve-controlled in unison or individually according to operational or design requirements. FIG. 2b shows the cyclonic separator 12 with arrows indicating some of the directions of movement of fluid through the above-described features.

Various modifications of the invention will be readily apparent to those skilled in the art. For example, the cyclonic separator 12 is shown with a cylindrical body such that the centrifugal force created is predominantly related to the flow rate of the fluids received from the inlet 6. However the skilled person will also appreciate that the shape of the cyclonic separator can be modified (including or not including a cone section 18) to configure the centrifugal force according to the requirements of the fluid treatment system. As another example, the gravitational separating chamber need not be spherical and may be alternatively shaped vessels designed to allow mixtures to undergo gravitational separation.

Figure 3:
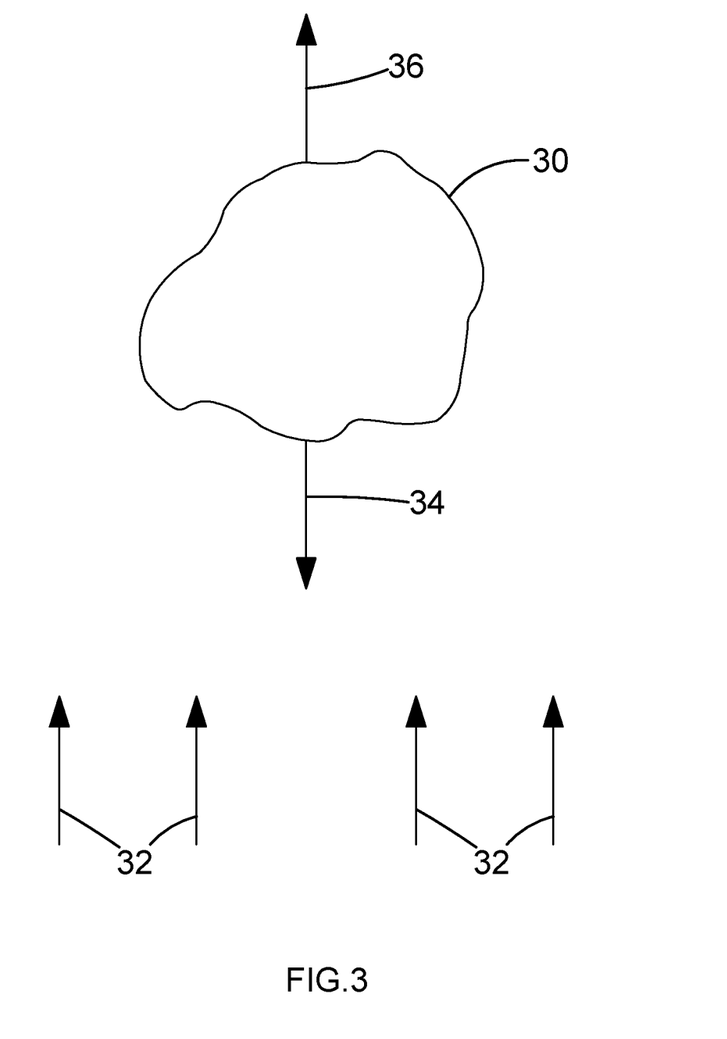
FIG. 3 is a schematic view of a solid particle within a gravitational separating chamber.

FIG. 3 illustrates the forces acting on a particle 30, which may be a sand particle or a heavy fluid drop (e.g. water) in the gravitational separating chamber 4, where lighter phases in the chamber rise up toward the top side of the chamber 4 in direction 32. Gravitational force 34 acts on the particle 30 to pull the particle down toward the bottom of the chamber 4, whilst a drag force 36 counteracts the gravitational force 34 in an upward direction which resists the particle's descent to the bottom of the chamber 4.

As will be understood by a person skilled in the art, the gravitational force 34 is dependent on the mass of the particle 30. Heavier particles will experience a greater gravitational force and lighter particles will experience a smaller gravitational force. The drag force 36 is dependent on the density of the fluid, the viscosity of the fluid and the velocity of the lighter phases rising along direction 32. Therefore, based on Stoke's Law, the separation of solids can be regulated, for example, by reducing the velocity of the rising fluids, the drag force 36 will reduce. This means that lighter particles, for example smaller grains of sand, can be separated more easily in the separating chamber 4 and the overall solid removal efficiency of the fluid treatment system 2 can be optimised.

The fluid velocity of the lighter phases (which rise up the chamber 4 in direction 32) can be controlled by influencing the flow rate of the lighter phases. This is achieved by controlling the flow rate across the aperture 20 between the separating chamber 4 and the fluid re-entry zone 24 of the cyclonic separator 12. Restricting the size of the aperture 20 decreases the fluid volume flow across the aperture(s). Similarly, increasing the size of the aperture, or apertures, increases the fluid volume flow across the aperture.

Figure 4:
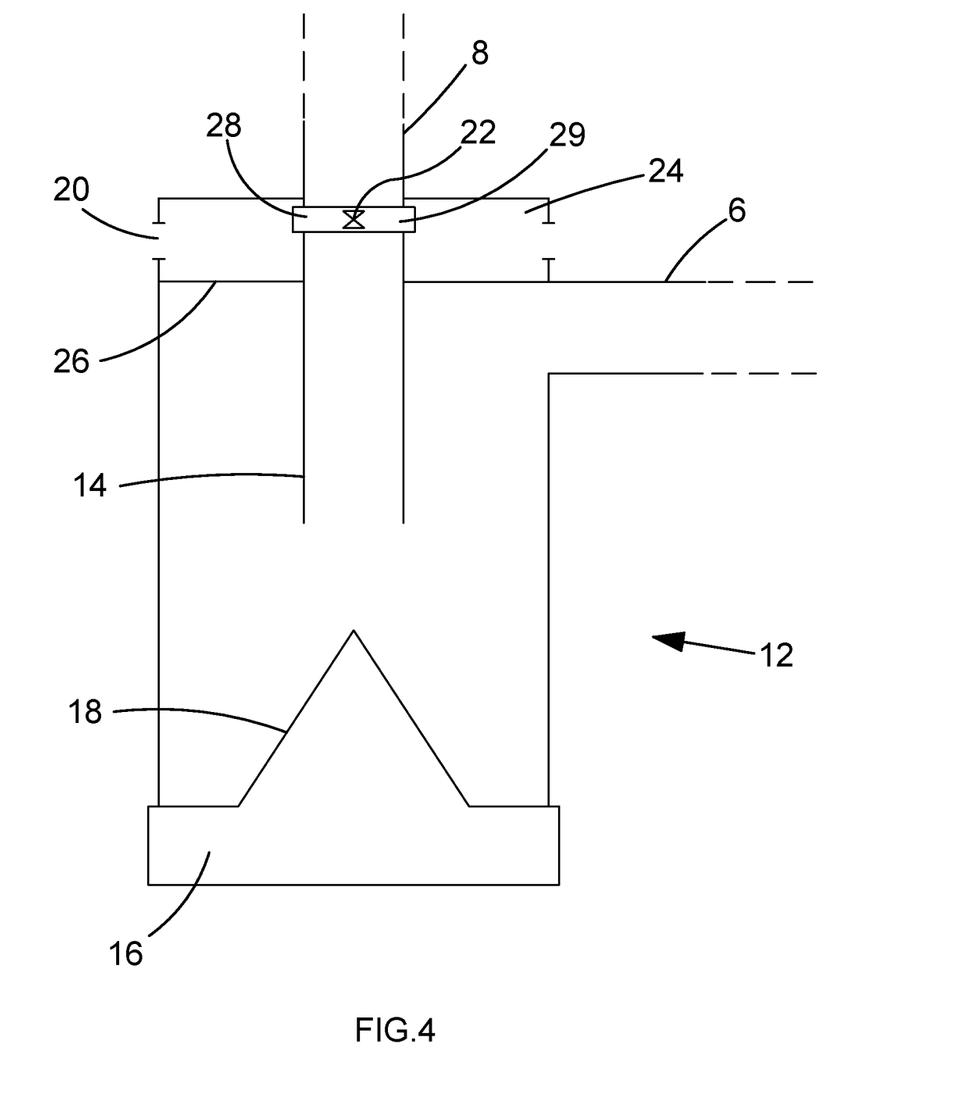
FIG. 4 is a schematic view of another cyclonic separator.

FIG. 4 shows a schematic view of cyclonic separator 12 where the sequential aperture 28 provides the limiting flow restriction between the spherical chamber 4 and the first outlet 8. The sequential aperture 28 is a valve-controlled opening where the valve 22 is used to control the size of the opening and regulate/restrict the flow. The sequential aperture 28 and the valve 22 are combined into an outlet nozzle 29. The outlet nozzle 29 is configured to control both the outgoing flow from the channel 14 and the outgoing flow from the fluid re-entry zone 24 in order to provide a single outgoing flow to the first outlet 8. The outlet nozzle 29 is an integrated module that can be readily added on or removed from the cyclonic separator to provide an optional additional flow controllability to the system. The removability of the outlet nozzle 29 allows intervention or maintenance operations to be more easily performed.

Figure 5:
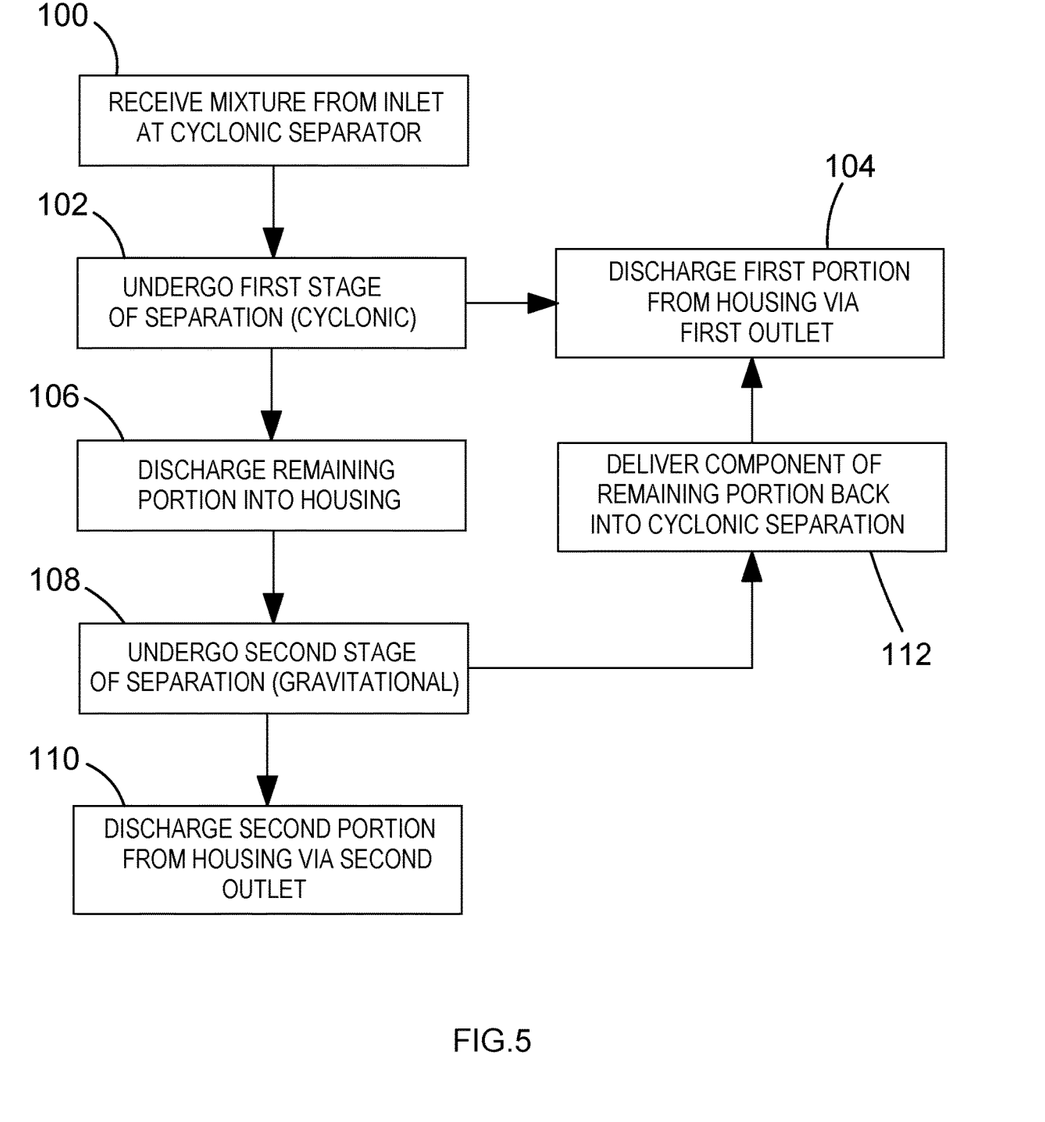
FIG. 5 is a flow diagram showing steps taken in a method of separating a mixture in a fluid treatment system.

FIG. 5 is a flow diagram showing a sequence of steps undertaken by a fluid treatment system 2 to separate a mixture according to the invention. At step 100 a mixture is received from an inlet 6 at a cyclonic separator 12 positioned within a housing, such as the spherical chamber 4. The received mixture undergoes a first stage of separation at step 102, where centrifugal forces created within the cyclonic separator 12 push heavier phases of the mixture toward the edge of the cyclonic separator and cause lighter phases of the mixture to be retained toward a central axis of the cyclonic separator and to travel up a channel 14 in the cyclonic separator 12. At step 104 a first portion of the mixture is discharged from the housing 4 via first outlet 8, and at step 106 the remaining portion of the mixture is discharged into the housing 4.

At step 108 the discharged remaining portion undergoes a second stage of separation, where heavy phases in the remaining portion descend toward the bottom of the housing and light phases in the remaining portion ascend toward the top of the housing. At step 110 a second portion of the mixture is discharged from the housing via second outlet 10.

At step 112 at least a component of the remaining portion (which may comprise the lighter phases that have risen to the top of the housing) enters back into a fluid re-entry zone 24 of the chamber of cyclonic separator 12 through an aperture 20. The component of the remaining portion which re-enters the cyclonic separator 12 can then recombine with the fluid travelling up the channel 14 of the cyclonic separator 12 and be discharged from the housing via the first outlet 8 along with the first portion at step 104.

It will be understood that the configurations described above allow improved control and separation efficiencies in fluid treatment systems by selecting aperture characteristics in accordance with operational requirements. The aperture(s) interface between a gravitational separation chamber and a cyclonic separator such that the size, shape, location and number of apertures influence the hydrostatic balance and fluid characteristics within a fluid treatment system in a way that can be better controlled. The fluid treatment system combines cyclonic separators and gravitational separators in a synergistic way which allows control between the maximum separation performance of the cyclonic separator and maximum separation performance of the gravitational separator to provide an improved fluid treatment system for use in onshore and offshore oil and gas operations and elsewhere.

Other embodiments will be apparent to those skilled in the art from consideration of the specification and practise of the embodiments disclosed herein. It is intended that the specification and examples be considered as exemplary only.

The invention claimed is:

1. A fluid treatment system for separating a mixture, comprising:
   a housing and a cyclonic separator positioned within the housing,
   the cyclonic separator configured to receive the mixture, discharge a first portion of the mixture from the housing through a first outlet and discharge a remaining portion of the mixture into the housing, the housing defining a gravitational separating chamber and comprising a second outlet for discharging a second portion of the mixture from the housing,
   the fluid treatment system further comprising at least one aperture arranged between the housing and the cyclonic separator, such that, in use, at least a component of the remaining portion re-enters the cyclonic separator through the at least one aperture,
wherein each size of the at least one aperture is configured to be continuously variable so as to optimize the separation of the mixture between the first portion and the second portion.

2. The fluid treatment system of claim 1, wherein the at least one aperture controls a flow rate between the gravitational separating chamber and a fluid re-entry zone in the cyclonic separator.

3. The fluid treatment system of claim 1, wherein the component of the remaining portion which re-enters the cyclonic separator combines with the first portion.

4. The fluid treatment system of claim 1, wherein the cyclonic separator further comprises a nozzle that controls a discharge flow rate of the remaining portion into the housing.

5. The fluid treatment system of claim 1 further comprising a regulator valve, wherein the regulator valve is configured to control the at least one aperture size between a fully-open position and a fully-closed position.

6. The fluid treatment system of claim 2 further comprising at least one additional aperture arranged between the fluid re-entry zone and the first outlet, such that, in use, the at least one aperture and the at least one additional aperture provide a multi-stage flow restriction between the housing and the first outlet.

7. The fluid treatment system of claim 6, wherein each size of the at least one additional aperture is individually variable.

8. The fluid treatment system of claim 7 further comprising a regulator valve, wherein the regulator valve is configured to control the at least one additional aperture size between a fully-open position and a fully-closed position.

9. The fluid treatment system of claim 8, wherein the regulator valve is arranged toward the first outlet and enables a first flow directly from the cyclonic separator and a second flow from the fluid re-entry zone to combine into one outgoing flow of the first portion.

10. The fluid treatment system of claim 1, wherein the cyclonic separator is substantially cylindrical.

11. The fluid treatment system of claim 1, wherein the cyclonic separator further comprises a cone-shaped section oppositely positioned to the first outlet in the cyclonic separator such that the apex of the cone-shaped section is arranged to point toward the first outlet.

12. The fluid treatment system of claim 1, wherein the cyclonic separator is positioned along a central axis of the housing.

13. The fluid treatment system of claim 1, wherein the housing is a spherical separator and the length of the cyclonic separator is a component which defines the separation performance of the fluids characteristics entering the fluid treatment system.

14. A method of separating a mixture in a fluid treatment system, comprising:
receiving the mixture into a cyclonic separator positioned within a housing from an inlet of the fluid treatment system;
discharging a first portion of the mixture from the housing through a first outlet and discharging a remaining portion of the mixture into the housing, the housing defining a gravitational separating chamber and comprising a second outlet;
separating the remaining portion in the housing and discharging a second portion of the mixture from the housing; and
returning at least a component of the remaining portion into the cyclonic separator through at least one aperture arranged between the housing and the cyclonic separator,
wherein each size of the at least one aperture is configured to be continuously variable so as to optimize the separation of the mixture between the first portion and the second portion.

15. The method of claim 14, wherein the at least one aperture controls a flow rate between the gravitational separating chamber and a fluid re-entry zone in the cyclonic separator, the method further comprising controlling the flow rate to influence a drag force acting on the mixture within the gravitational separating chamber.

16. The method of claim 15, wherein the drag force determines a degree of solids separation from the mixture.

17. The method of claim 15 further comprising providing a multi-stage flow restriction between the housing and the first outlet with the at least one aperture and at least one additional aperture arranged between the fluid re-entry zone and the first outlet.

18. The method of claim 17, wherein each size of the at least one additional aperture is individually variable, the method further comprising controlling both an outgoing flow from the cyclonic separator and an outgoing flow from the fluid re-entry zone to influence a drag force acting on the mixture within the gravitational separating chamber.

19. The method of claim 18, wherein the drag force determines a degree of solids separation from the mixture.

\* \* \* \* \*